US006866285B1

(12) United States Patent
Stamp

(10) Patent No.: US 6,866,285 B1
(45) Date of Patent: Mar. 15, 2005

(54) TRAILER HITCH AND DRAW BAR SYSTEM

(76) Inventor: Shawn Stamp, 12343 Ascot La., Spring Hill, FL (US) 34609

( * ) Notice: Subject to any disclaimer, the term of this patent is extended or adjusted under 35 U.S.C. 154(b) by 0 days.

(21) Appl. No.: 10/722,354

(22) Filed: Nov. 25, 2003

(51) Int. Cl.$^7$ ................................................ B60D 1/52
(52) U.S. Cl. ................................ 280/491.5; 280/511
(58) Field of Search ........................ 280/491.5, 491.3, 280/491.1, 511, 504

(56) References Cited

U.S. PATENT DOCUMENTS

| | | | | |
|---|---|---|---|---|
| 2,685,468 | A | * | 8/1954 | Blocker et al. ............. 403/350 |
| 5,476,279 | A | * | 12/1995 | Klemetsen ............... 280/415.1 |
| 6,203,048 | B1 | * | 3/2001 | Adair ...................... 280/491.5 |
| 6,527,292 | B2 | * | 3/2003 | Adair ...................... 280/491.3 |
| 2004/0104558 | A1 | * | 6/2004 | Williams ................... 280/506 |

* cited by examiner

Primary Examiner—Lesley D. Morris
Assistant Examiner—Tony Winner
(74) Attorney, Agent, or Firm—Edward P. Dutkiewicz

(57) ABSTRACT

A hitch attachment assembly has a female extending tube with a hollow rectangular interior and a pair of side faces. A pair of apertures are aligned with each other on the side faces of the female extending tube of the hitch attachment assembly. A hitch draw bar has a male extending tube with an outer rectangular configuration. The male extending tube is positionable within the female extending tube when in a use orientation. A cylindrical finger has an external end and an internal end coupled with respect to the male extending tube. A diametrical bore is provided through the external end. The finger is positionable within the pair of apertures when in a storage orientation. A locking pin is adapted to pass through the bore of the finger when in the storage orientation.

8 Claims, 4 Drawing Sheets

TRAILER HITCH AND DRAW BAR SYSTEM

BACKGROUND OF THE INVENTION

1. Field of the Invention

The present invention relates to a trailer hitch and draw bar system and more particularly pertains to allowing variable positions of storage for a trailer hitch.

2. Description of the Prior Art

The use of trailer hitches of known designs and configurations is known in the prior art. More specifically, trailer hitches of known designs and configurations previously devised and utilized for the purpose of hitching a trailer though known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,602,529 for an antisway trailer hitch issued to Derr in Aug. 31, 1971. U.S. Pat. No. 3,572,750 for an anti-sway trailer hitch issued to Derr in Mar. 30, 1971. Lastly, U.S. Pat. No. 5,580,088 for a manually operated trailer hitch with extendable swinging boom issued to Griffith in Dec. 3, 1996.

While these devices fulfill their respective, particular objectives and requirements, the aforementioned patents do not describe trailer hitch and draw bar system that allows for variable positions of storage for a trailer hitch.

In this respect, the trailer hitch and draw bar system according to the present invention substantially departs from the conventional concepts and designs of the prior art, and in doing so provides an apparatus primarily developed for the purpose of allowing variable positions of storage for a trailer hitch.

Therefore, it can be appreciated that there exists a continuing need for a new and improved trailer hitch and draw bar system which can be used for allowing variable positions of storage for a trailer hitch. In this regard, the present invention substantially fulfills this need.

SUMMARY OF THE INVENTION

In view of the foregoing disadvantages inherent in the known types of trailer hitches of known designs and configurations now present in the prior art, the present invention provides an improved trailer hitch and draw bar system. As such, the general purpose of the present invention, which will be described subsequently in greater detail, is to provide a new and improved trailer hitch and draw bar system and method which has all the advantages of the prior art and none of the disadvantages.

To attain this, the present invention essentially comprises a hitch attachment assembly. The hitch assembly is adapted to couple to the rear of a motor vehicle. The hitch assembly has a female extending tube. The female extending tube has a hollow rectangular interior, a top face, a bottom face, a first side face, and a second side face.

A pair of apertures is provided. The pair of apertures includes a primary aperture and secondary aperture. The apertures are laterally aligned from each other on the side faces of the female extending tube of the hitch attachment assembly. The primary aperture is in the first side face of the hitch attachment assembly. The primary aperture is in an eight pointed star configuration. Each of the points is formed by a 90 degree angle. The secondary aperture is in the second side face of the hitch attachment assembly. The secondary aperture has a circular configuration.

Provided next is a hitch draw bar. The hitch draw bar has a coupling assembly. The coupling assembly is adapted to releasably attach to a trailer. The trailer is from the class of trailers. The class of trailers includes, but is not limited to boats, mobile homes, cars and wheelchair lifts. The hitch draw bar has a ball and a leveling portion. The ball and leveling portion are specific to the application. The ball and leveling portion are adapted to align the motor vehicle hitch attachment assembly with the trailer. The hitch draw bar further includes a male extending tube. The male extending tube has an outer rectangular configuration. The male extending tube has an end face. The male extending tube is adapted to be slidably received inside of the female extending tube of the hitch attachment assembly when in a use orientation. The hitch draw bar is adapted to be stored at any of a plurality of various angles with respect to the motor vehicle. Due to the various combinations the rectangular male extending tube can fit into the eight pointed star configuration of the primary aperture of the hitch attachment assembly. In this manner safety and convenience is maximized.

Further provided is a retractable cylindrical finger. The retractable cylindrical finger has an external end and an internal end. A diametric bore is provided through the external end. A coil spring is provided adjacent to the internal end. A supporting chamber is provided for receiving the coil spring and the internal end of the finger. The finger is retractably coupled to the male extending tube of the hitch draw bar. The finger extends perpendicularly from the end face of the male extending tube. The finger is adapted to retract into the male extending tube. The finger is held extended with the spring. The finger is adapted to retract when the male extending tube of the hitch draw bar is in the female extending tow during the use orientation. The finger is adapted to remain extended when the finger is passed through the pair of apertures during the storage orientation.

Provided last is a locking pin. The locking pin is adapted to pass through the bore of the external end of the finger and retain the hitch draw bar in the storage orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved trailer hitch and draw bar system which has all of the advantages of the prior art trailer hitches of known designs and configurations and none of the disadvantages.

It is another object of the present invention to provide a new and improved trailer hitch and draw bar system which may be easily and efficiently manufactured and marketed.

It is further object of the present invention to provide a new and improved trailer hitch and draw bar system which is of durable and reliable constructions.

An even further object of the present invention is to provide a new and improved trailer hitch and draw bar system which is susceptible of a low cost of manufacture with regard to both materials and labor, and which accordingly is then susceptible of low prices of sale to the consuming public, thereby making such trailer hitch and draw bar system economically available to the buying public.

Even still another object of the present invention is to provide a trailer hitch and draw bar system for allowing variable positions of storage for a trailer hitch.

Lastly, it is an object of the present invention to provide a new and improved trailer hitch and draw bar system. A hitch attachment assembly has a female extending tube with a hollow rectangular interior and a pair of side faces. A pair of apertures are aligned with each other on the side faces of the female extending tube of the hitch attachment assembly. A hitch draw bar has a male extending tube with an outer rectangular configuration. The male extending tube is positionable within the female extending tube when in a use orientation. A cylindrical finger has an external end and an internal end coupled with respect to the male extending tube. A diametrical bore is provided through the external end. The finger is positionable within the pair of apertures when in a storage orientation. A locking pin is adapted to pass through the bore of the finger when in the storage orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
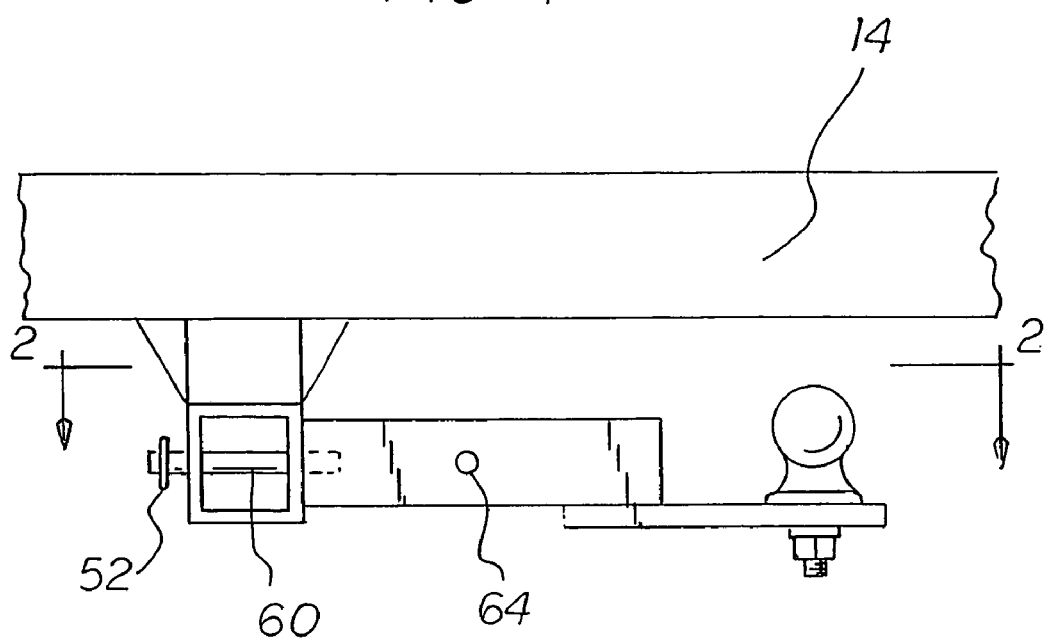
FIG. 1 is a rear elevational view of a trailer hitch and draw bar system constructed in accordance with the principles of the present invention, the system being in a storage orientation.

With reference now to the drawings, and in particular to FIG. 1 thereof, the preferred embodiment of the new and improved trailer hitch and draw bar system embodying the principles and concepts of the present invention and generally designated by the reference numeral 10 will be described.

The present invention, the trailer hitch and draw bar system 10 is comprised of a plurality of components. Such components in their broadest context include a hitch attachment, a pair of apertures, a hitch draw bar, a cylindrical finger, and a locking pin. Such components are individually configured and correlated with respect to each other so as to attain the desired objective.

First provided is a hitch attachment assembly 12. The hitch assembly is adapted to couple to the rear of a motor vehicle 14. The hitch assembly has a female extending tube 16. The female extending tube has a hollow rectangular interior, a top face 18, a bottom face 20, a first side face 22, and a second side face 24.

A pair of apertures 26 is provided. The pair of apertures includes a primary aperture 26 and secondary aperture 28. The apertures are laterally aligned from each other on the side faces of the female extending tube of the hitch attachment assembly. The primary aperture 26 is in the first side face of the hitch attachment assembly. The primary aperture is in an eight pointed star configuration 30. Each of the points is formed by a 90 degree angle. The secondary aperture 28 is in the second side face of the hitch attachment assembly. The secondary aperture has a circular configuration.

Provided next is a hitch draw bar 32. The hitch draw bar has a coupling assembly 34. The coupling assembly is adapted to releasably attach to a trailer. The trailer is from the class of trailers. The class of trailers includes, but is not limited to boats, mobile homes, cars and wheelchair lifts. The hitch draw bar has a ball and a leveling portion 36. The ball and leveling portion are specific to the application. The ball and leveling portion are adapted to align the motor vehicle hitch attachment assembly with the trailer. The hitch draw bar further includes a male extending tube 38. The male extending tube has an outer rectangular configuration. The male extending tube has an end face 40. The male extending tube is adapted to be slidably received inside of the female extending tube of the hitch attachment assembly when in a use orientation. The hitch draw bar is adapted to be stored at any of a plurality of various angles with respect to the motor vehicle. Due to the various combinations the rectangular male extending tube can fit into the eight pointed star configuration of the primary aperture of the hitch attachment assembly. In this manner safety and convenience is maximized.

Further provided is a retractable cylindrical finger 42. The retractable cylindrical finger has an external end 44 and an internal end 46. A diametric bore 48 is provided through the external end. A coil spring 50 is provided adjacent to the internal end. A supporting chamber 51 is provided for receiving the coil spring and the internal end of the finger. The finger is retractably coupled to the male extending tube of the hitch draw bar. The finger extends perpendicularly from the end face of the male extending tube. The finger is adapted to retract into the male extending tube. The finger is held extended with the spring. The finger is adapted to retract when the male extending tube of the hitch draw bar is in the female extending tow during the use orientation. The finger is adapted to remain extended when the finger is passed through the pair of apertures during the storage orientation.

Provided last is a locking pin 52. The locking pin is adapted to pass through the bore of the external end of the finger and retain the hitch draw bar in the storage orientation. These various features may be seen in FIGS. 4 through 6.

Figure 2:
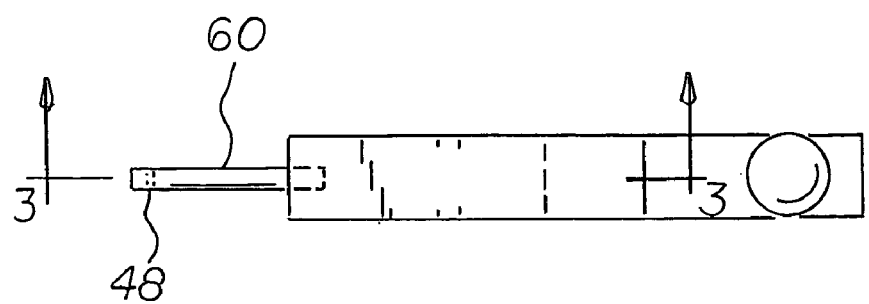
FIG. 2 is a plan view of the hitch draw bar taken along line 2—2 of FIG. 1.
Figure 3:
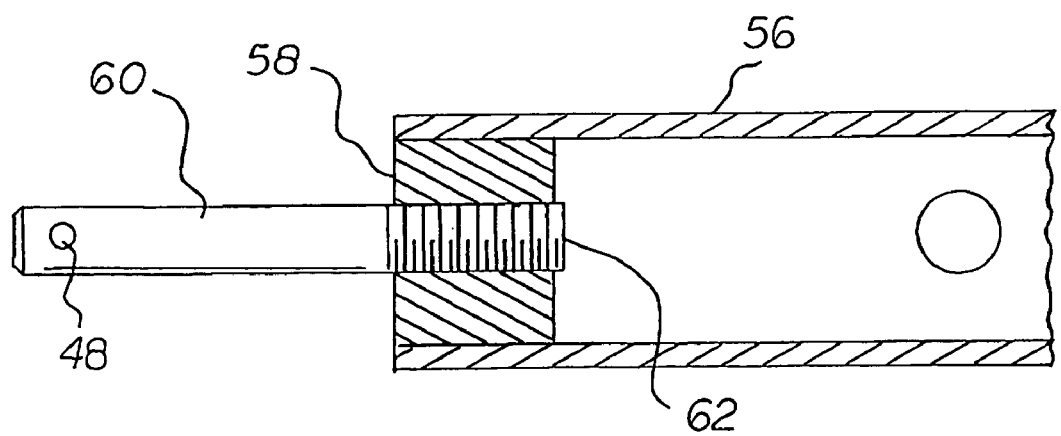
FIG. 3 is a cross sectional view taken along line 3—3 of FIG. 2.

In an alternate embodiment of the present invention, as may be seen in the embodiment of FIGS. 1 through 3, the cylindrical finger 60 has an external end and an internal end. A diametric bore 48 is provided through the external end. The internal end has male threads 62. The internal end also includes a stopper 58 in the end of the hitch coupling assembly 56. The stopper has female threads for receiving the male threads of the finger.

Figure 4:
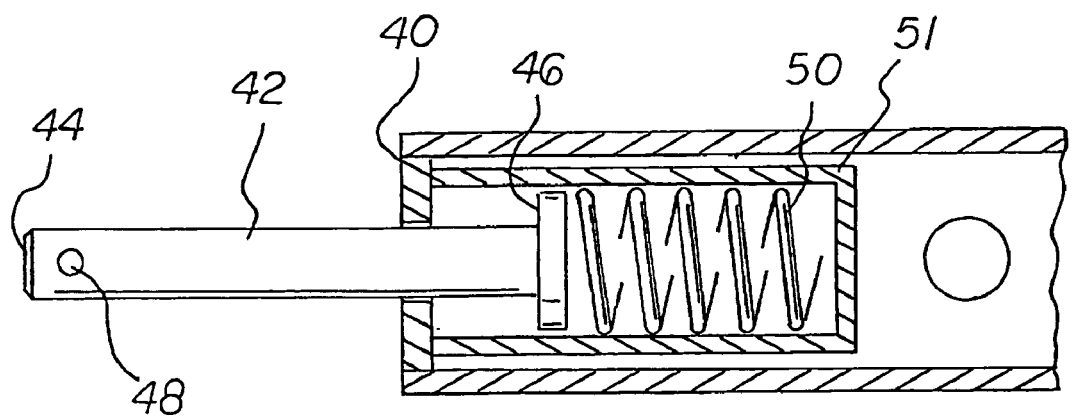
FIG. 4 is a cross sectional view similar to FIG. 3 but illustrating an alternate embodiment of the invention.
Figure 5:
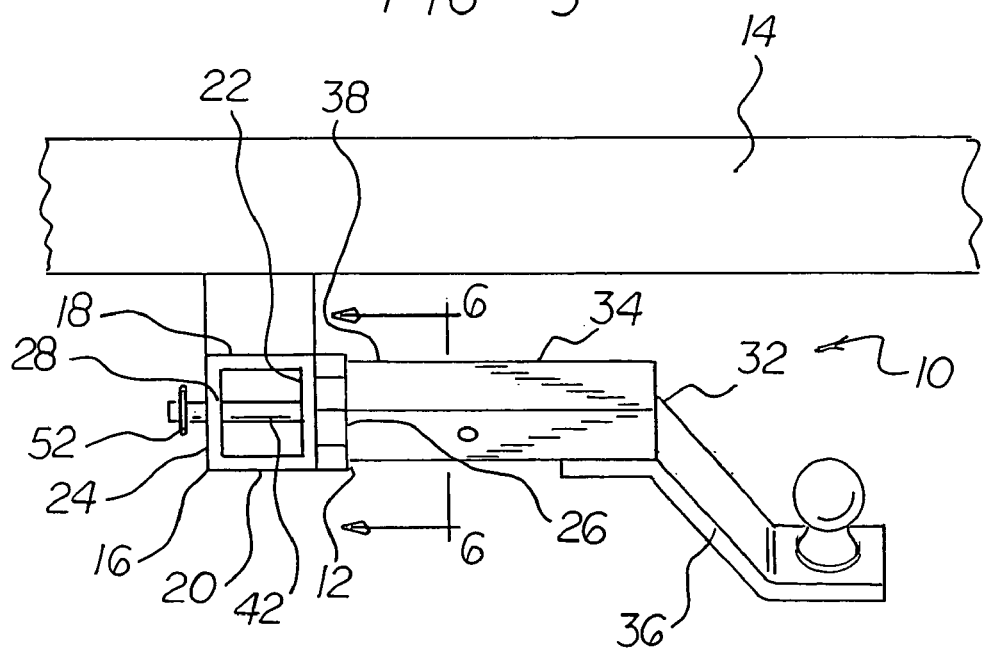
FIG. 5 is a rear elevational view of a trailer hitch and draw bar system similar to FIG. 1 but constructed in accordance with an alternate embodiment of the present invention.
Figure 6:
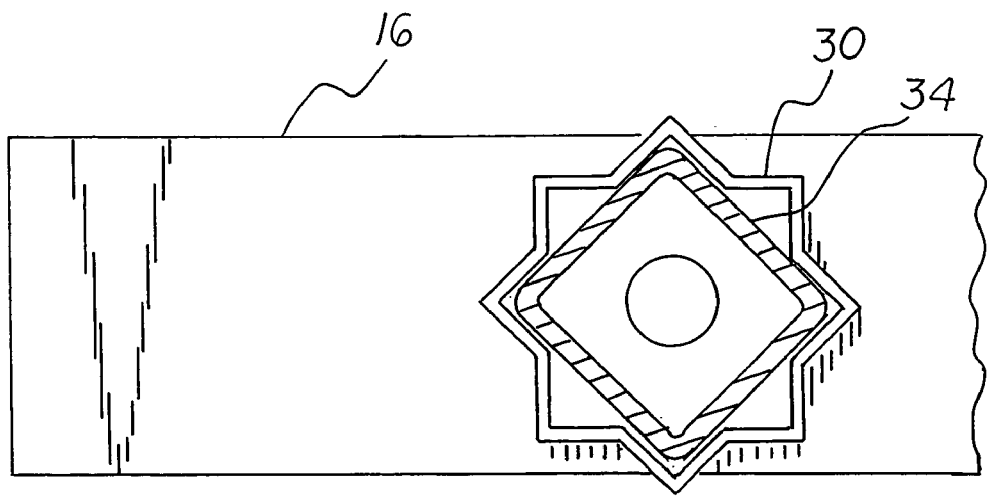
FIG. 6 is a cross sectional view taken along line 6—6 of FIG. 5.

As may be seen in the embodiment of FIGS. 1 through 3 as well as the embodiment of FIGS. 4 through 6, a pair of apertures are aligned with each other on the side faces of the female extending tube 56 of the hitch attachment assembly. Note FIGS. 1 and 5. Each aperture is of a circular configuration. Aligned circular apertures 64 are provided in the male extending tube 38. The apertures of the male extending tube are adapted to be aligned with the pair of apertures on the side faces of the female extending tube for receiving a pin for securement purposes when in the use orientation.

Figure 7:
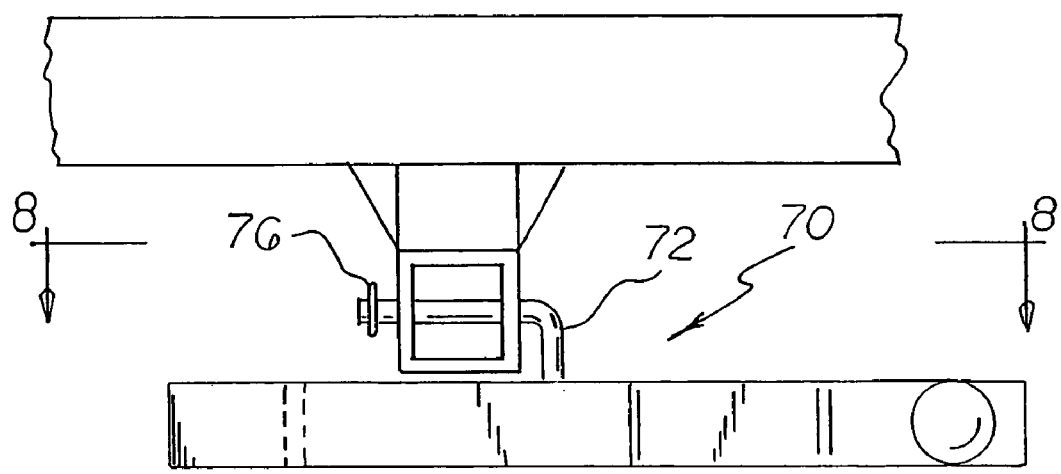
FIG. 7 is a rear elevational view of a trailer hitch and draw bar system similar to FIGS. 1 and 5 but constructed in accordance with a final alternate embodiment of the present invention.
Figure 8:
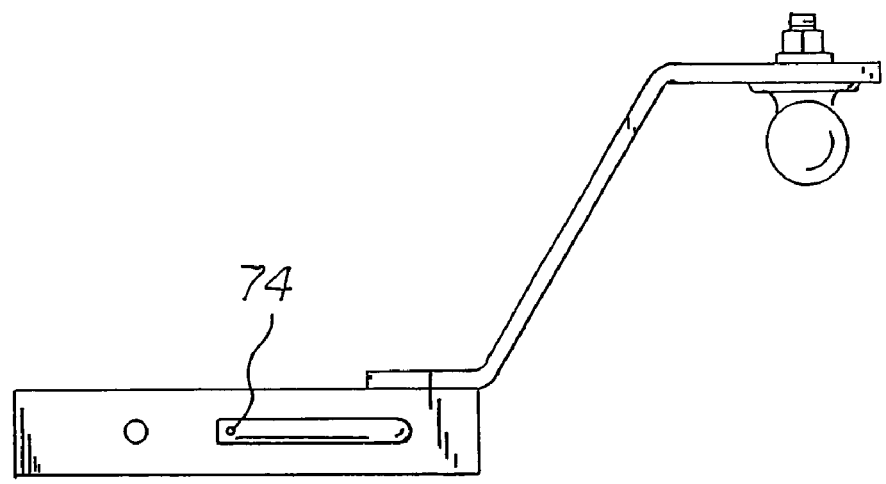
FIG. 8 is a cross sectional view taken along line 8—8 of FIG. 5.

A final embodiment of the invention is shown in FIGS. 7 and 8. In such embodiment, the system 70 includes a finger 72 which is of an L-shaped configuration. The shorter portion of the finger is welded to the exterior surface of the male extending tube while the longer portion is parallel with, and spaced from, the male extending tube. An aperture 74 extends through the finger adjacent to its free end. This allows a pin 76 to extend through the aperture during storage beneath the male extending tube.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A trailer hitch and draw bar system to allow variable positions of storage for a trailer hitch comprising, in combination:

a hitch attachment assembly adapted to couple to the rear of a motor vehicle and having a female extending tube with a hollow rectangular interior and a top face, bottom face and first side face and second side face;

a pair of apertures, including a primary aperture and secondary aperture laterally aligned from each other on the side faces of the female extending tube of the hitch attachment assembly, the primary aperture being in the first side face of the hitch attachment assembly and having an eight pointed star configuration with each of the points being formed by a 90 degree angle and the secondary aperture being in the second side face of the hitch attachment assembly and having a circular configuration;

a hitch draw bar having a coupling assembly adapted to releasably attach to a trailer from the class of trailers including but not limited to boats, mobile homes, cars and wheelchair lifts, the hitch draw bar having a ball and a leveling portion specific to the application and adapted to align the motor vehicle hitch attachment assembly with the trailer, the hitch draw bar further including a male extending tube with an outer rectangular configuration and an end face with the male extending tube being adapted to be slidably received inside of the female extending tube of the hitch attachment assembly when in a use orientation, the hitch draw bar being adapted to be stored at any of a plurality of various angles with respect to the motor vehicle due to the various combinations the rectangular male extending tube can fit into the eight pointed star configuration of the primary aperture of the hitch attachment assembly to thereby maximize safety and convenience;

a retractable cylindrical finger having an external end and an internal end with the external end having a diametric bore there through with a coil spring adjacent to the internal end and a supporting chamber for receiving the coil spring and the internal end of the finger, the finger being retractably coupled to the male extending tube of the hitch draw bar and extending perpendicularly from the end face of the male extending tube and being adapted to retract into the male extending tube and held extended with the spring, the finger being adapted to retract when the male extending tube of the hitch draw bar is in the female extending tow during the in use orientation and the finger being adapted to remain extended when the finger is passed through the pair of apertures during the storage orientation; and a locking pin being adapted to pass through the bore of the external end of the finger and retain the hitch draw bar in the storage orientation.

2. A trailer hitch and draw bar system comprising:

a hitch attachment assembly having a female extending tube with a hollow rectangular interior and a pair of side faces;

a pair of apertures aligned with each other on the side faces of the female extending tube of the hitch attachment assembly;

a hitch draw bar having a male extending tube with an outer rectangular configuration, the male extending tube positionable within the female extending tube when in a use orientation; and a cylindrical finger having an external end and an internal end coupled with respect to the male extending tube and with the external end having a diametrical bore there through, the finger positionable within the pair of apertures when in a storage orientation; and a locking pin adapted to pass through the bore of the finger when in the storage orientation.

3. The system as set forth in claim 2 wherein the pair of apertures include a primary aperture and secondary aperture laterally aligned from each other on the side faces of the female extending tube of the hitch attachment assembly, the primary aperture being in the first side face of the hitch attachment assembly and having an eight pointed star configuration with each of the points being formed by a 90 degree angle and the secondary aperture being in the second side face of the hitch attachment assembly and having a circular configuration.

4. The system as set forth in claim 2 wherein the cylindrical finger has an external end and an internal end with the external end having a diametric bore there through with a coil spring adjacent to the internal end and a supporting chamber for receiving the coil spring and the internal end of the finger, the finger being retractably coupled to the male extending tube of the hitch draw bar and extending perpendicularly from the end face of the male extending tube and being adapted to retract into the male extending tube and held extended with the spring, the finger being adapted to retract when the male extending tube of the hitch draw bar is in the female extending tube during the in use orientation and the finger being adapted to remain extended when the male extending tube is in the primary aperture and the finger is passed through the secondary aperture during the storage orientation.

5. The system as set forth in claim 2 wherein the cylindrical finger has an external end and an internal end with the external end having a diametric bore there through and with the internal end having male threads and also including a stopper in the end of the hitch coupling assembly, the stopper having female threads for receiving the male threads of the finger.

6. The system as set forth in claim 2 wherein the pair of apertures aligned with each other on the side faces of the female extending tube of the hitch attachment assembly are each of a circular configuration and further including aligned circular apertures in the male extending tube, adapted to be aligned with the pair of apertures on the side faces of the female extending tube for receiving a pin for securement purposes when in the use orientation.

7. The system as set forth in claim 2 wherein the internal end of the finger is within the male extending tube.

8. The system as set forth in claim 2 wherein the finger is L-shaped and external of the male extending tube.

* * * * *